(12) United States Patent
Friedrichs

(10) Patent No.: US 9,970,829 B2
(45) Date of Patent: May 15, 2018

(54) METHOD AND APPARATUS FOR CONTROLLING THE TEMPERATURE OF A CALIBRATION VOLUME OF A DEVICE FOR COMPARATIVE CALIBRATION OF TEMPERATURE SENSORS

(71) Applicant: SIKA Dr. Siebert & Kühn GmbH & Co. KG, Kaufungen (DE)

(72) Inventor: René Friedrichs, Göttingen (DE)

(73) Assignee: SIKA Dr. Sieber & ëhn GmbH & Co. KG, Kaufungen (DE)

( * ) Notice: Subject to any disclaimer, the term of this patent is extended or adjusted under 35 U.S.C. 154(b) by 425 days.

(21) Appl. No.: 14/720,096

(22) Filed: May 22, 2015

(65) Prior Publication Data
US 2015/0338289 A1   Nov. 26, 2015

(30) Foreign Application Priority Data

May 23, 2014  (DE) .................. 10 2014 007 786

(51) Int. Cl.
| | | |
|---|---|---|
| *G01K 15/00* | (2006.01) | |
| *G05D 23/19* | (2006.01) | |
| *G05B 13/04* | (2006.01) | |
| *G05B 17/00* | (2006.01) | |

(52) U.S. Cl.
CPC ......... *G01K 15/002* (2013.01); *G01K 15/005* (2013.01); *G05D 23/1919* (2013.01); *G05B 13/04* (2013.01); *G05B 17/00* (2013.01)

(58) Field of Classification Search
None
See application file for complete search history.

(56) References Cited

U.S. PATENT DOCUMENTS

2012/0330465 A1*  12/2012  O'Neill .................. F24F 11/006
                                               700/276

FOREIGN PATENT DOCUMENTS

| DE | 20317566 U1 | 1/2004 |
|---|---|---|
| WO | WO-2011100736 A2 | 8/2011 |
| WO | WO-2013113683 A2 | 8/2013 |

OTHER PUBLICATIONS

Mathematical Models of Systems, available at https://web.archive.org/web/20140327005947/http://saadat.us/download/Intro2MatlabCh2.pdf, Mar. 27, 2014.*
Machine translation for DE 20317566, Sep. 13, 2017.*

* cited by examiner

*Primary Examiner* — John Kuan
(74) *Attorney, Agent, or Firm* — Dinsmore & Shohl LLP

(57) ABSTRACT

The invention relates to a method for regulating the temperature of the calibration volume of an apparatus for comparative calibration of temperature sensors to a target temperature, wherein said calibration device comprises heat sources and/or heat sinks, which are in thermal contact via a heat conducting part or a plurality of heat conducting parts with the calibration volume, wherein in at least one process step the real thermal state is calculated, wherein the Kalman filter is fed the measurement values of a temperature sensor located in the calibration device, and in at least one more process step the future thermal state is calculated using a thermal model of the dynamics of states.

22 Claims, 4 Drawing Sheets

METHOD AND APPARATUS FOR CONTROLLING THE TEMPERATURE OF A CALIBRATION VOLUME OF A DEVICE FOR COMPARATIVE CALIBRATION OF TEMPERATURE SENSORS

CROSS-REFERENCE TO RELATED APPLICATION

This application is the national phase of DE 10 2014 007 786.1, filed May 23, 2014, the content of which is incorporated herein in its entirety.

FIELD OF THE INVENTION

The invention relates to a method for controlling the temperature of the calibration volume of a device for comparative calibrating of temperature sensors to a target temperature, wherein said calibrating apparatus comprises heat sources and/or heat sinks which are in thermal contact with the calibration volume through one or more heat conducting parts, as well as a device for regulating the temperature of a calibration volume of a device for comparative calibrating of temperature sensors to a target temperature, wherein the device consists at least of an electronic data processing unit that through an interface can receive measurement data of at least one temperature sensor located in the calibration device.

BACKGROUND OF THE INVENTION

The predominant number of temperature sensors used in industry and research are secondary thermometers. This means that the corresponding sensors, such as e.g. resistance thermometers or thermocouples must be repeatedly calibrated at least prior to their first use and usually also in the course of their regular use. For this purpose the temperature-sensitive sensors or temperature-stabilized switches to be calibrated are compared in furnaces or baths with a standard thermometer. Devices that temper a corresponding calibration volume to a predetermined constant target temperature are known. These so-called temperature calibrators can be designed as heavy immobile devices or, as they are described in the document U.S. Pat. No. 3,939,687 A, as compact portable calibrators.

In order to ensure optimum thermal coupling of the samples to the calibration or test volume, various insert sleeves or sockets that are adapted to the sensors to be tested can be introduced as solid bodies into the calibration volume of the temperature calibrator. For the calibration of sensors with complicated geometries, the calibration volume can be filled with liquid, gaseous or granular calibration media. In order to achieve spatial temperature distribution as constant as possible within the calibration volume, the calibration medium should have the highest possible thermal conductivity. To guarantee a very constant temperature curve, i.e., a high temperature stability, the calibration medium should have the highest possible thermal capacity. Since the calibration volume is to be tempered to the target temperature set by the user, heat can be removed from or added to the calibration volume through a thermally conductive body surrounding the volume. This body is typically designed in immobile calibrators as a tank and in portable calibrators typically as a metallic block and is in thermal contact with heat sinks, such as Peltier elements operated as cooling elements as described in DE 2005 006 710 U1, or the colder ambient air and heat sources, such as a resistance heating or warmer ambient air.

This leads to the question with which intensity or power the adjustable cooling and heating elements (control and manipulated variables) must be operated so that the temperature of the calibration volume (process variable) reaches the desired temperature value (setpoint) as quickly as possible and also holds it as stable as possible even with temporal changes such as the ambient air (disturbance parameter). The regulation technology problem of setting the control variables as a function of the temperatures measured in the calibration volume or in the heat conduction member (measurands) is solved by the present invention.

A well-known approach for controlling heating and cooling systems is the use of one or more associated PID controllers, as described in DE 2023130 B. A general disadvantage of the use of PID controllers is that, at least to achieve optimal control performance, i.e. a high stability of the temperature of the calibration volume, a very fine adjustment or complicated determination of the control parameters is necessary.

Another drawback in the case of the control of a temperature calibrator is that the optimal control parameters are dependent on environmental conditions, such as the ambient temperature, humidity or power supply. However, the main difficulty in the control of temperature calibrators is the large inertia of the controlled system, which extends from the heat sources and heat sinks over the heat conduction part to the calibration volume. Thus, even with relatively slow variations due to the high heat capacity of the heat conduction part, which may be designed as a metal block, and the calibration volume, which can be designed as a metallic insert bushing, the heating power with a frequency of less than 0.1 Hz, a phase lag of the temperature of the calibration volume for the heating capacity of nearly $3\pi$ can be observed. Accordingly, a stable control that responds to changes in environmental conditions within about seconds is not possible by means of one or several PID controllers or only after an extensive determination of appropriate control parameters. This has the consequence that the achievable temperature stability for target temperatures above 500° C. with the temperature calibrators available on the market at the time is about ±30 mK, and thus almost an order of magnitude worse than that necessary for high-precision temperature calibrations stability of ±5 mK.

One way to achieve both a high level of temperature homogeneity and a temporal temperature stability is the integration of one or more fixed-point cells in the block of a temperature calibrator as described in the document WO 2013/113683 A2. A disadvantage of the solution is that the constancy of the temperature of the fixed-point cell over the period of the phase transformation is given only for a phase transition temperature of the fixed-point cell used. At the same time the fixed-point cells are expensive so that a device for calibration at different temperature points stabilized by corresponding fixed-point cells would be associated with very high costs.

The dynamic calibration procedure described in document KR 100991021 B1 operates without costly temperature control. Instead, the temperature in the calibration volume near the calibration temperature to be observed is intentionally lowered or increased, and the resulting temperature offset between the normal thermometer and the samples is compensated by a time offset calculation. A disadvantage of this calibration is that the additional uncertainty resulting from the compensation is of the order of ±20 to ±40 mK and thus is significantly larger than the desired ±5 mK. A further disadvantage of the dynamic calibration is that the calibration is not performed at a temperature point, but rather within a temperature interval whose extent cannot be neglected and its location relative to the calibration point under consideration is not defined.

SUMMARY OF THE INVENTION

According to the invention, a model-based control method is used to control the temperature of the calibration volume to reach a target temperature. The required model of the dynamics of the controlled system preferably includes control and manipulated variables, such as the intensity or power of the adjustable cooling and heating elements, disturbances, such as the ambient temperature or variations in the supply voltage, and process variables, such as temperatures within the calibration volume or their changes over time.

The model can be implemented as a calculating rule on an electronic data processing unit, for example on a microcontroller within or outside of the calibrator. The thus formed model can calculate future values of the process variables as a function of possible values of the disturbance, control and manipulated variables.

The model can exist for example in the form of one or more transfer functions. It is advantageous that the associated transfer functions can be easily measured, because temperature measuring points are already integrated at the relevant positions in the temperature calibrator or there are corresponding sensor receptacles.

Alternatively, the model can also exist in the state-space representation. The corresponding model equations can then for example be derived from the known heat equation. Since a solution to the heat equation can usually be done only numerically for the geometry of a real temperature calibrator and is very expensive, it is advantageous to derive only the structure of the model equations from the heat equation and to determine the free parameters of the model by means of a measurement of the transfer functions.

In the case of a continuous-time modeling of the state dynamics, the model is preferably formulated as a linear system of differential equations $$\frac{d\bar{x}(t)}{dt} = A\bar{x}(t) + B\bar{u}(t),$$

wherein $\bar{x}(t)$ denotes the vector of the thermal state of the calibrator and the ambient environment and $\bar{u}(t)$ denotes the vector of the control and manipulated variables.

The elements of the state vector are preferably formed of temperatures at the positions in the calibration volumes, temperatures at the positions in the heat conduction part of the calibrator, temperatures around or inside the housing of the calibrator and systematic differences in the temperature readings of temperature sensors.

Furthermore, the state vector may also include heat flows or temporal changes of temperatures. The elements of the vector of control and manipulated variables are preferably formed from the activation level or the power of heating and cooling elements. The values of matrices A and B can for example be determined by measuring the corresponding transfer functions.

In the case of a discrete-time modeling of the dynamics of states for the time points $t_n = t_{n-1} + \theta$ with a suitable time increment $\theta$, the model is preferably formulated as a linear difference equation $\bar{x}_n = F \cdot \bar{x}_{n-1} + G \cdot \bar{u}_{n-1}$ for the states $\bar{x}_n = \bar{x}(t_n)$. Here, the coefficients of the matrices F and G are preferably calculated by numerical or analytical integration of said differential equation system rather than by an implementation of the computation rule, and then implemented on a microcontroller or other compact electronic data processing unit. The resulting calculation rule in the form of a linear difference equation with constant-time matrices or matrices with constant-time coefficients can be carried out very quickly so that the model can also be used for fast control of the temperature calibrator with time increments of less than 100 ms.

In a preferred embodiment, the coefficients of the matrices F(T) and G(T) are calculated in dependence on the temperature of the calibration volume, and during the control of the calibration volume to a target temperature $T_{target}$ for modeling the dynamics of the states the matrices with constant time coefficients $F(T_{target})$ and $G(T_{target})$ are used. Due to this procedure, the temperature dependence of thermal conductivity and heat capacity caused by nonlinearity of the dynamics of states is sufficiently taken into account without increasing the complexity of the model because the associated computation rule is still a linear difference equation with time-constant coefficients.

The formulation of the model as a linear difference equation for the states $\bar{x}_n = \bar{x}(t_n)$ has the further advantage that it is identical with the prediction equation of the discrete Kalman filter which is preferably used for the estimation of states $\bar{x}_n = \bar{x}(t_n)$. In this case, the calculation result of the Kalman filter is referred to as an estimate, because it includes not only the actual values for the state but also the associated uncertainty estimation. The calculated estimated uncertainties lie in the case of temperature sensors used for temperature calibration typically in the range of a few milli-Kelvin so that in the scope of the invention, the estimation result of the Kalman filter is of sufficient accuracy for controlling the temperature of the calibration volume. The indirect determination of a temperature, for example at a place with difficult access in a furnace, by measuring a temperature at another easily accessible position by using a Kalman filter is a known method and was described by Mouzinho et al. [L. F. Mouzinho, J V FonsecaNeto, B. A. Luciano and R C S Freire, "INDIRECT MEASUREMENT OF THE TEMPERATURE VIA KALMAN FILTER" XVIII IMEKO World Congress, Metrology for a Sustainable Development, 17 to 22 Sep. 2006 Rio de Janeiro, Brazil].

It has been found that for achieving a high quality of control of the state vector, it must include a variety of temperatures at up to 20 different positions in the heat conducting part of the calibrator, which for example may be formed from the metal block of a portable dry-block calibrator. A measurement of the temperature at many positions is technically possible but correspondingly expensive. For this reason, temperatures are measured preferably only at one or two places in the heat conduction part by means of one or two integrated internal reference sensors and from them the remaining temperatures in the state vector are calculated by means of the Kalman filter. Subsequently, the estimate of the temperature condition can be improved by the use of the temperature measurement values of the temperature sensors located in the calibration volume. For this purpose, in addition to the measured values of the internal reference sensors, the measured values of one or more external reference sensors are preferably supplied to the Kalman filter.

It has further been found that the application of the Kalman filter described by Mouzinho et al. to estimate the temperatures at positions in the heat conduction part and in the calibration volume results in errors that may be in the order of some 10 mK. Although such deviations can be neglected for conventional indirect temperature measurements in industrial environments, they are not acceptable in the regulation of calibration devices for highly accurate temperature sensors. These deviations occur when the readings of more than one temperature sensor are supplied to the Kalman filter and are due to the fact that because of the uncertainty, two sensors in their calibration have a small but finite and, in particular, different systematic error in the measurements displayed. To control a temperature calibrator, these deviations cannot be neglected even with the use of high-precision traceable reference sensors.

According to an advantageous embodiment of the invention, using the Kalman filter, these deviations in the state estimation are taken into account in that a temperature sensor is selected in the calibrator, and the systematic deviations of the temperature readings from the other sensors are added relative to this reference sensor as being estimated time constant temperature differences of the state vector.

This has the consequence that while temperature values in the calibration volume and the heat conduction part estimated by the Kalman filter still have a bias based on the international temperature scale, this offset is the same for all temperatures and in all positions. This property is of central importance for the temperature control, because different systematic errors in the temperature values would result in systematically wrong heat flux predictions and thus to systematically wrong temperature estimates.

The reference sensor is preferably selected such that the measurement values exhibit the smallest systematic measurement deviation from the international temperature scale so that all of the temperature values calculated by the Kalman filter have this systematic error.

In an embodiment for quick calibration of temperature sensors, the temperature readings of the samples are supplied to the Kalman filter and the respective systematic deviations of the measured values in relation to the reference sensor are added to the state vector as the temperature offset to be estimated. The systematic deviation of the sample measurement values from the measured values of the reference standard is exactly the temperature offset to be determined by the calibration. This temperature offset of interest is usually determined by expensive comparison of the temperature measurement curves of the sample and the reference standard for a period of typically 30 minutes after reaching a stable temperature levels in the vicinity of the target temperature. According to an embodiment of the invention, the temperature offset calculated by the Kalman filter is available as an element of the state vector at any time during the calibration process and can be directly read or displayed. The displayed value for the temperature offset between the specimen and the reference standard is sufficiently stable typically after a few minutes after reaching the desired temperature and then corresponds to the offset of the temperature of the specimen relative to the reference standard, which is obtained by comparing the measured temperature curves over a longer period.

From the knowledge of the state of the calibrator estimated using the Kalman filter and the environment, it can be calculated, using the model of the dynamics of the states, how the control and manipulated variables must be set in the future for the future behavior of the process variables to come as close as possible to the desired behavior of the process variables. This optimal setting of the control and manipulated variables then results in an optimal behavior of the control variables.

If, for example, the goal is that the calibration volume be heated in the next 100 seconds to a nominal temperature of exactly 50° C., it can be calculated using a continuous-time model in the form of the above linear differential equation which temperatures T0 and T1000 will be reached when the heating power at this time is 0 or 1 kW. Due to the linearity of the differential equation, the optimum heat output in the observed 100 seconds is then (50° C.−T0)/(T1000−T0)*1 kW. The disadvantage of this approach is that, if the appropriate performance is even adjustable, although the desired 50° C. can be achieved exactly in 100 seconds, both before and after significant deviations from the target temperature can occur both before and after, e.g. in the form of overshoots.

Preferably, therefore, the desired behavior is specified as a minimum mean square deviation of the process variables from the reference values over a period of length $\tau$ instead of at a single point in time. To solve the resulting quadratic optimization problem quickly and with a sufficient optimization result, preferably a discrete-time model of the dynamics of the states in the form of a linear difference equation is used to calculate the resulting process variables and the number of the values considered as to be set for the control and manipulated variables is reduced to a small finite number greater than 1. Thus, the number of the temporal sequences of the control and manipulated variables to be considered in the optimization and the number of the resulting mean square deviations to be calculated by the model become finite.

It has been found that in order to avoid overshoots in the temperature behavior of the calibration volume, the time horizon $\tau$, over which the course of the process variables is considered, is preferably longer than 10 seconds.

With a time horizon of only 15 seconds and only one control variable, which can assume only the values 0 or 1 and whose setting can be changed only every 0.5 second, there result $2^{30}$ and thus more than a billion possible timings of the control variable within this time horizon. Preferably, therefore, the number of the mean deviations of the process variables from the set point to be calculated is further reduced by not considering all possible timings of the control variables during the optimization, but rather only an appropriately selected subset. The resulting pseudo-optimal setting of the control variables is the timing of the control variables whose resulting mean square deviation is not greater than some mean-square deviation resulting from a different settings of the considered subset.

The subset is preferably selected as such number of settings, which deviate little from the optimal or pseudo optimal timing, which has been calculated in a previous optimization step.

The model-based control of the temperature of the calibration volume preferably includes the following four steps, which are repeated periodically in the order shown, with the associated cycle duration preferably less than one second. In the first step, a measurement of a subset of the current thermal state variables is performed. In the second step, the whole of the actual state variables is estimated on the basis of the values measured in the first step, a previous estimate of the total of the state variables and the previous values of the control and manipulated variables, preferably by means of a discrete Kalman filter.

In the third step, the optimal or pseudo-optimal values of control and manipulated variables, for which the future behavior of the process variables comes sufficiently close to the desired behavior of the control variables, is calculated, preferably by means of a discrete-time thermal model for the dynamics of the states. In the fourth step, the optimal values of the control and manipulated variables are set for the current time.

A particular advantage of the model-based control according to the invention is that for target temperatures above 500° C. it allows to reach temporal temperature stabilities which with about ±3 mK are better in the order of magnitude than the stabilities previously achieved for this temperature range. Thus, a highly accurate calibration can be performed in the region of high temperatures of up to 700° C.

Another advantage of the model-based predictive control of the temperature of the calibration volume is that overshoots are avoided in the process variable by calculating the deviations at several points in time in the future. Thereby, the temporal stability of the temperature of the calibration volume is reached faster.

BRIEF DESCRIPTION OF THE FIGURES

Further advantages, features and details emerge from the following description of an embodiment in conjunction with the drawings. In the drawings.

DETAILED DESCRIPTION OF THE INVENTION

Figure 1:
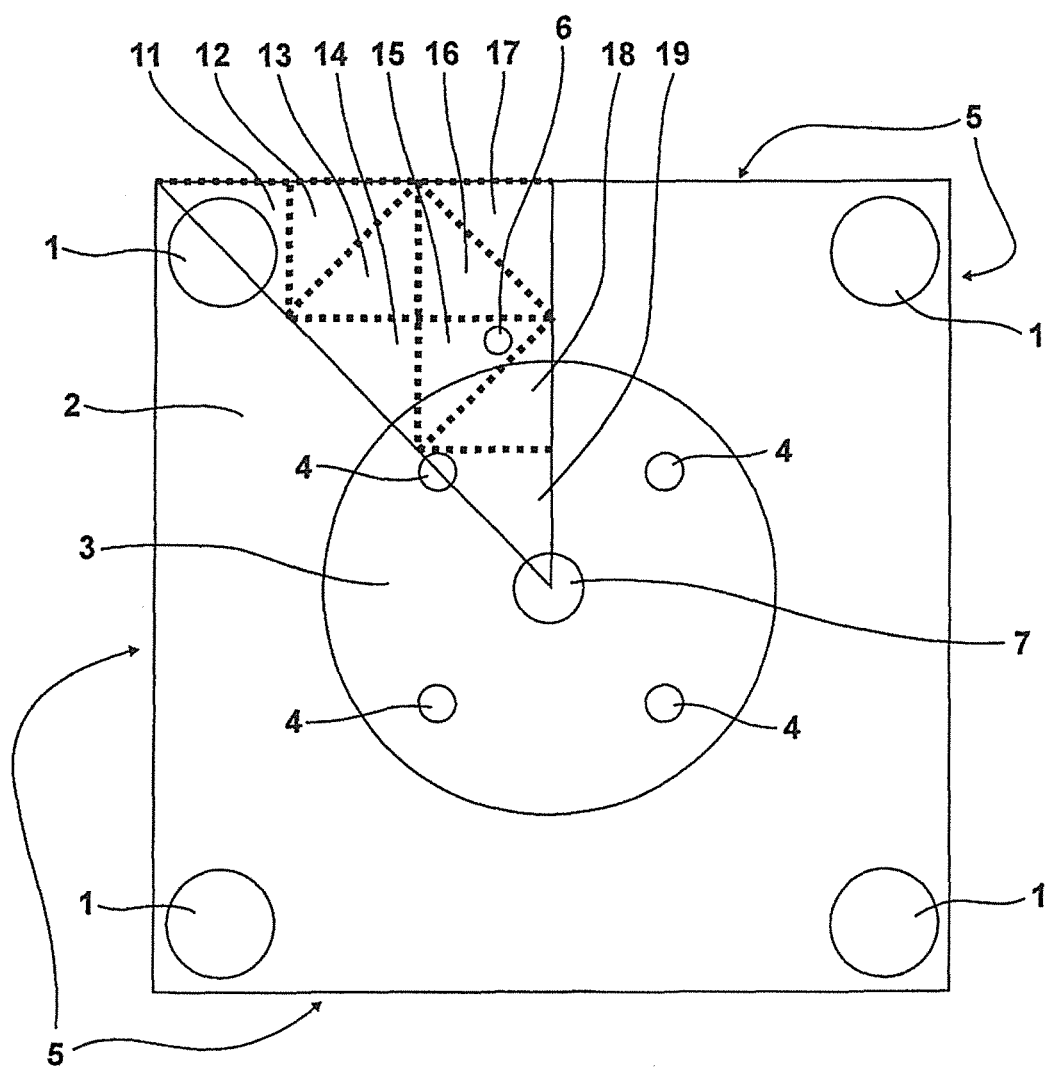
FIG. 1 shows a thermal model of a portable metal block calibrator having a metallic heat conduction part 2 and the calibration volume 3, wherein in the first of the nine elements of the model 11, 12, . . . , 19 is a heat source 1, in the fifth element of the model is an internal reference sensor 6, and in the ninth element of the model is an external reference sensor 7.

FIG. 1 shows a thermal model of a portable metal block calibrator, on whose basis hereinafter the control of the temperature of the calibration volume 3 of the metal block calibrator to a target temperature is performed.

Into the calibration volume 3 can be inserted metallic sleeves adapted to temperature sensors to be checked, with receiving bores 4 for the samples. The temperature of the calibration volume 3 is measured by means of an external reference sensor 7. The indicator of the internal reference sensor 6 is the only source of information on the temperature distribution in the heat transfer part 2 which is designed as a metal block. To control the temperature of the calibration volume 3 to the desired target value, the heat sources 1 designed as heating elements can be activated or deactivated with an electronic control system. The outer sides of the heat conduction part 2 fulfill the function of a heat sink 5. For modeling the dynamics of the thermal states, the cross section of the metal block calibrator is notionally divided into triangular elements of the same size and the temperature distribution in heat conduction part 2 and in the calibration volume 3 is represented by the temperatures of the individual elements of the thermal network. Due to the symmetry of the arrangement of the heat sources 1 designed as heating elements, it is sufficient to model only the illustrated three-side surface as a thermal network with the nine elements 11, 12, . . . , 19, taking into account in the following that thermal energy from the network can flow only into the heat sink 5. The thermal network of the nine elements 11, 12, . . . , 19 is supplied heat only via the heat source 1 in the first element 11.

The temporal change of the temperature in an element is then given by the equation $$m_i k \frac{dT_i}{dt} = Q_i.$$

Here $m_i$ is the mass of the element, k is the specific heat capacity of the metal used and $Q_i$ is the heat flow in the element. It results from the temperature differences from the adjacent elements and the associated heat transfer coefficient $\alpha_{ij}$, and contact surfaces $L_{ij}$ according to the equation $Q_i = \alpha_{ij}(T_j - T_i) + \alpha_{il} L_{il}(T_l - T_i) + \alpha_{in} L_{in}(T_n - T_i)$.

For the state vector $\overline{T}(t)$ of the nine temperatures relative to ambient temperature thus results a linear system of differential equations $$\frac{d\overline{T}(t)}{dt} = A\overline{T}(t) + Bu(t)$$

with the control variable u(t) and the matrix B, which contains the free parameter p in the Form [p 0 0 0 0 0 0 0 0]' because heat energy is supplied only into the first element 11. It is assumed that the coefficients of heat transfer between all elements of the heat conduction part 2 designed as a metal block or all of the elements of the calibration volume 3 filled with the metallic insert sleeve are equal to each other.

However, they can differ both from the coefficient of heat transfer from the elements in the heat conduction part 2 to the heat sink 5 and from the coefficients of heat transfer from the elements in the heat conduction part 2 to the elements in the calibration volume 3. If in addition, based on the geometric model uncertainty, one admits that the mass of an element in the calibration volume 3 is greater by a factor d than the mass of an element in the heat conduction part 2 of the metal block calibrator, the result for matrix A is the structure $$\begin{pmatrix} -a-b & b & 0 & 0 & 0 & 0 & 0 & 0 & 0 \\ b & -a-b-b\sqrt{2} & b\sqrt{2} & 0 & 0 & 0 & 0 & 0 & 0 \\ 0 & b\sqrt{2} & b(-2-\sqrt{2}) & b & 0 & b & 0 & 0 & 0 \\ 0 & 0 & b & -2b & b & 0 & 0 & 0 & 0 \\ 0 & 0 & 0 & b & -2b-c & b & 0 & c & 0 \\ 0 & 0 & b & 0 & b & b(-2-\sqrt{2}) & b\sqrt{2} & 0 & 0 \\ 0 & 0 & 0 & 0 & 0 & b\sqrt{2} & -a-b\sqrt{2} & 0 & 0 \\ 0 & 0 & 0 & 0 & \dfrac{c}{d} & 0 & 0 & \dfrac{-c-b}{d} & \dfrac{b}{d} \\ 0 & 0 & 0 & 0 & 0 & 0 & 0 & \dfrac{b}{d} & \dfrac{-b}{d} \end{pmatrix}$$

with the four free parameters a, b, c and d.

In order to determine the total free parameters p, a, b, c, and d of the thermal model, the amplitude values 60 and the phase values 65 of both the internal transfer function, i.e. the transfer from the heat source 1 to the temperature of the internal reference sensor 6, and the amplitude values 70 and the phase values 75 of the external transfer function, i.e. the transfer from the internal reference sensor 6 to the temperature of the external reference sensor 7, are measured for selected frequencies.

Figure 2:
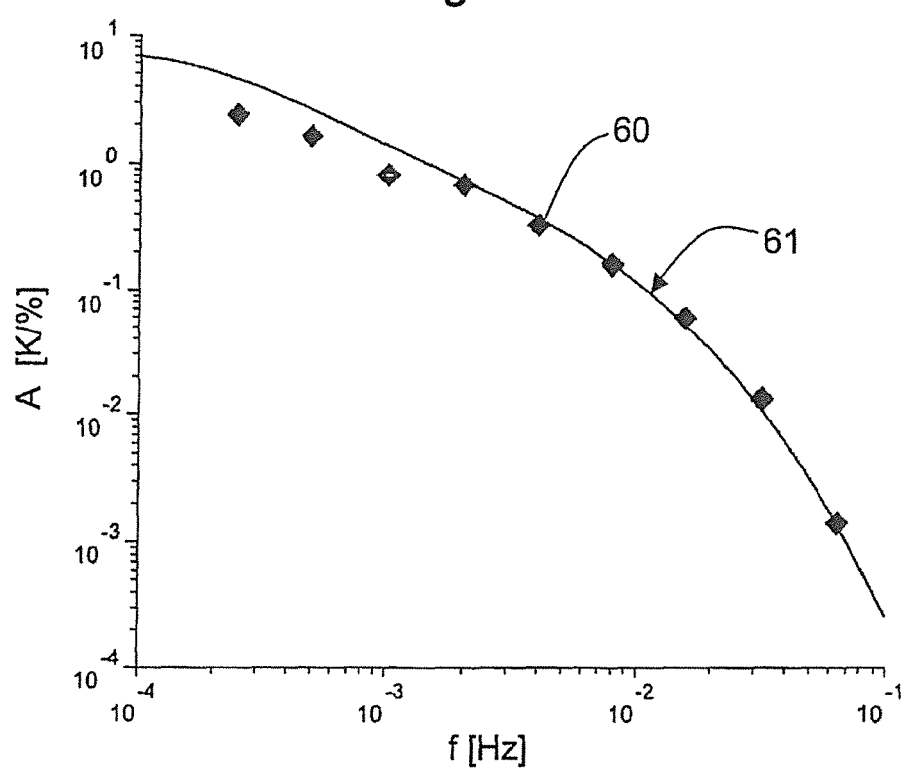
FIG. 2 shows the Bode plot of amplitude 61 and phase 66 of the internal transfer function which results from a thermal model adapted to the amplitude measurement values 60 and phase measurement values 65.
Figure 2:
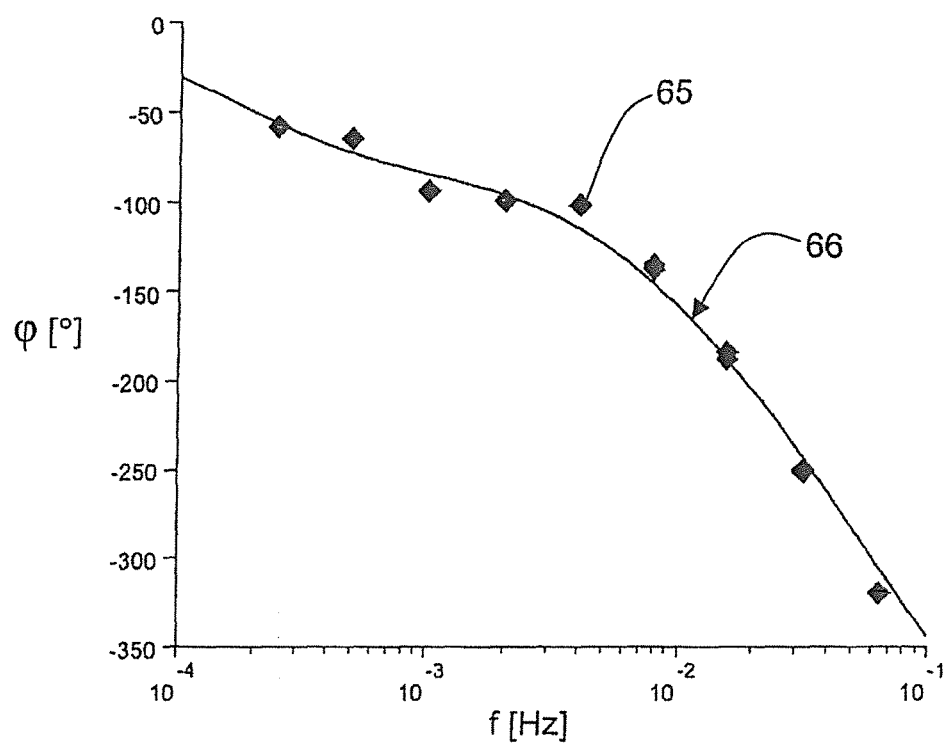
Figure 3:
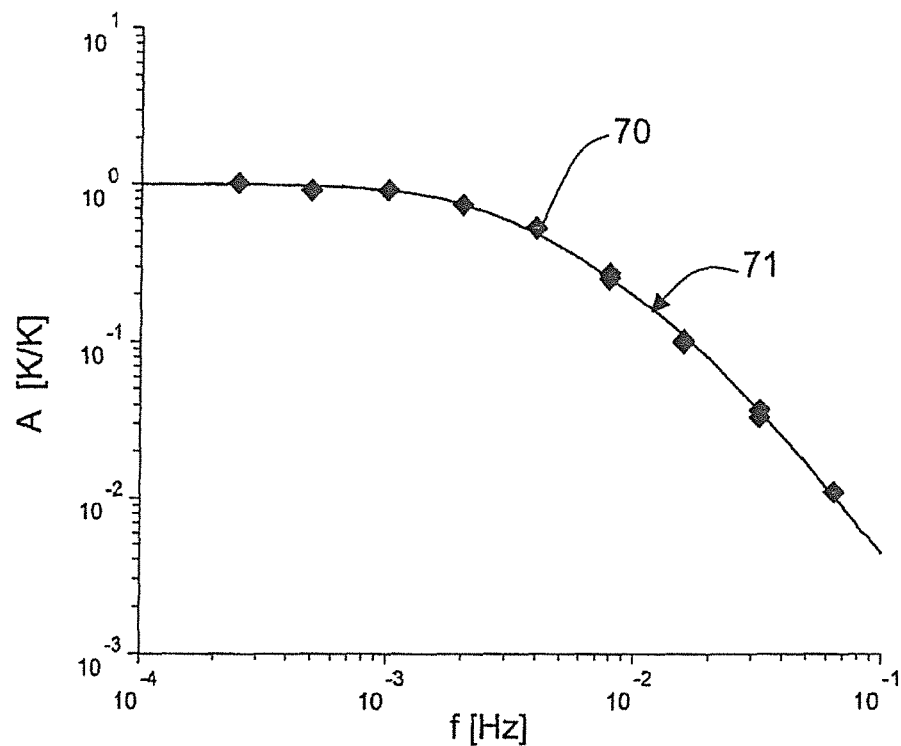
FIG. 3 shows the Bode plot of amplitude 71 and phase 76 of the external transfer function that results from a thermal model adapted to the amplitude values 70 and phase measurements 75.
Figure 3:
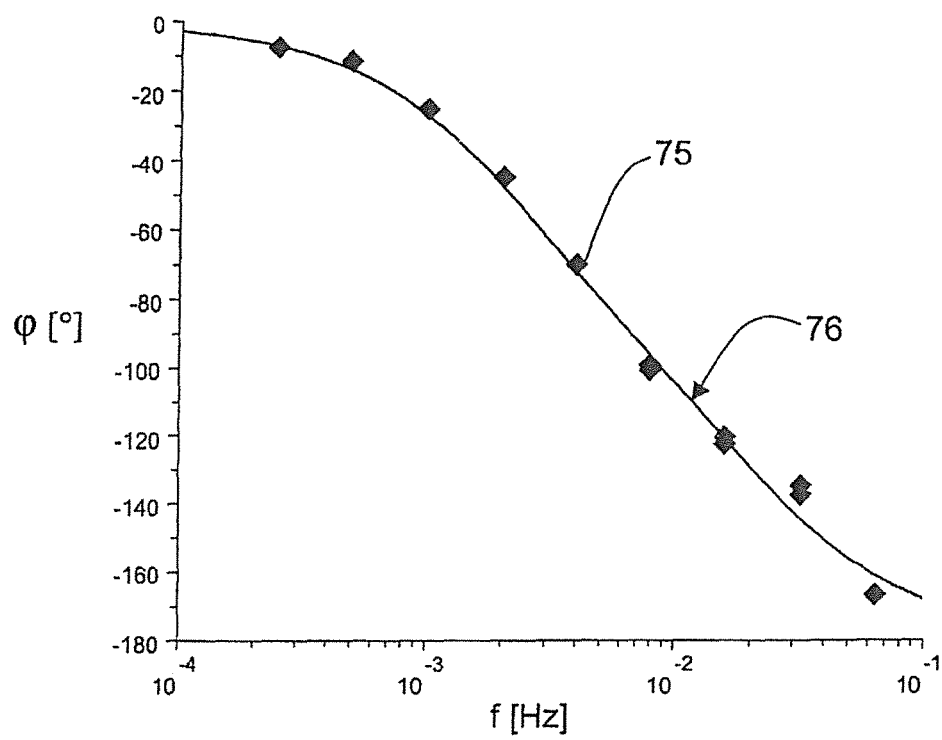

Subsequently, the transfer functions resulting from the linear system of differential equations for different values of the free parameters of the model are calculated and compared with the measured data. At a temperature of the calibration volume of 600° C. there results a good agreement with the measured values for p=0.11 K/s, a=0.0044 1/s, b=0.11 1/s, c=0.071 1/s and d=2.1, both for the Bode diagram of the internal transfer function with amplitude response 61 shown in FIG. 2 and phase response 66 as well as for the Bode diagram of the external transfer function shown in FIG. 3 with amplitude response 71 and phase characteristic 76.

In order to suitably reformulate the present thermal model, known as a linear system of differential equations with constant coefficients and known constant matrices A and B, for use in a discrete Kalman filter, an increment of time e of 100 ms for discrete-time modeling is chosen in this embodiment. From the amplitude 61 in the Bode diagram of the internal transfer function shown in FIG. 2 it can be concluded that due to the large thermal inertia of the heat conduction part 2 with an on/off control of the heat sources 1 with an associated clock frequency 1/θ of 10 Hz, a resolution significantly better than 1 μK can be achieved for the control of the temperature in the immediate vicinity of the internal reference sensor.

In the considered embodiment, in order to estimate the thermal conditions, the temperature readings of both the internal reference sensor 6 and the external reference sensor 7 with a refresh rate of 10 Hz are fed to the discrete Kalman filter. The signal noise 2σ of both reference sensors is about 4 mK.

The continuation of the thermal states to be estimated $$x_n = \begin{pmatrix} T(t_n) \\ T_U(t_n) \\ T_{Offset} \end{pmatrix}$$

includes, in addition to the temperatures $T(t_n)$ of the nine members of the thermal network at the points in times $t_n = t_{n-1} + 100$ ms, also the time-dependent ambient temperature $T_U(t_n)$ and the time-independent systematic offset $T_{Offset}$ between the measured temperature values of the internal reference sensor 6 and the external reference sensor 7. This produces for the states the linear stochastic difference equation $x_n = F \cdot x_{n-1} + G \cdot u_{n-1} + w_{n-1}$, from which result the matrices F and G with time-constant coefficients by integration of linear differential equation system with the previously determined time constant matrices A and B over a period of θ=100 ms with u(t)=0 (heat sources to) and u(t)=1 (heat sources from). The random variables $w_n$ represent the system noise and are assumed to be normally distributed with zero mean and covariance matrix Q. The temperature readings of the two references $\Theta_{In}(t_n)$ and $\Theta_{Ex}(t_n)$ result from the $$z_n = \begin{pmatrix} \Theta_{in}(t_n) \\ \Theta_{Ex}(t_n) \end{pmatrix} = H \cdot x_n + v_n$$

measurement equation with the measurement matrix $$H = \begin{bmatrix} 0 & 0 & 0 & 0 & 1 & 0 & 0 & 0 & 0 & 0 & 0 \\ 0 & 0 & 0 & 0 & 0 & 0 & 0 & 0 & 1 & 0 & 0 \end{bmatrix}.$$

The random variables $v_n$ represent the measurement noise and are assumed to be normally distributed with zero mean and covariance matrix R.

The central component and the main advantage of the discrete Kalman filter used in this embodiment is that in addition to the estimation of a state $\bar{x}_n$, the uncertainty of this estimate is always calculated in the form of the estimation error covariance matrix $P_n$.

In the predicting step for the point in time $t_{n-1}$ are determined both the estimator for the state and the associated covariance matrix initially only using the estimation results for the point in time $t_{n-1}$ according to the first model equation in the form of a linear difference equation with a time constant coefficients $\hat{x}_n^- = F \cdot \hat{x}_{n-1} + G \cdot u_{n-1}$ and the second model equation of the Kalman filter $P_n^- = F \cdot P_{n-1} \cdot F^t + Q$. In the following sub-step of the Kalman filter, this prediction is corrected, with consideration of temperatures $(\Theta_{In}, \Theta_{Ex})^t = z_n$ measured at the point in time $t_n$, according to the correction equations $\hat{x}_n = \hat{x}_n^- + K_n(z_n - H\hat{x}_n^-)$ and $P_n = (I - K_n \cdot H) \cdot P_n^-$. The so-called Kalman gain is given by $K_n = P_n^- \cdot H^t \cdot (H \cdot P_n^- \cdot H^t + R)^{-1}$.

After the estimate of the current thermal condition $x_n$ in the previous process step the first model equation of the Kalman filter can be used again in the form of a linear difference equation with time-constant coefficients to estimate, for each bit sequence $(u_n, u_{n+1}, \ldots, u_{n+N})$ of the future values (0/1) of the control variable $u_{(t)}$ over the time horizon t=30 s, which chronology $(\hat{T}_{Ex}(t_{n+1}), \hat{T}_{Ex}(t_{n+2}), \ldots, \hat{T}_{Ex}(t_{n+N+1}))$ would result in the temperature readings of the external reference 7 from the associated heating profile of the heat sources. In order to achieve a fast and stable control, such a sequence of bits is now set, from which such a time sequence results, at which within the horizon τ the mean square deviation of the temperature of the external reference from the set temperature is as small as possible.

In order to obtain within the selected time increment θ of 100 ms a sufficient result of the quadratic optimization in the form of a pseudo optimal bit sequence, the bit sequence, which has been calculated in the previous control period as the pseudo optimal, is used as a starting sequence of the optimization and, by randomly inverting individual bits of this starting sequence, more bit sequences are generated so that an appropriate subset of all possible settings of the control variable is created, on which then the dynamics of the states and quadratic optimization can be predicted.

Figure 4:
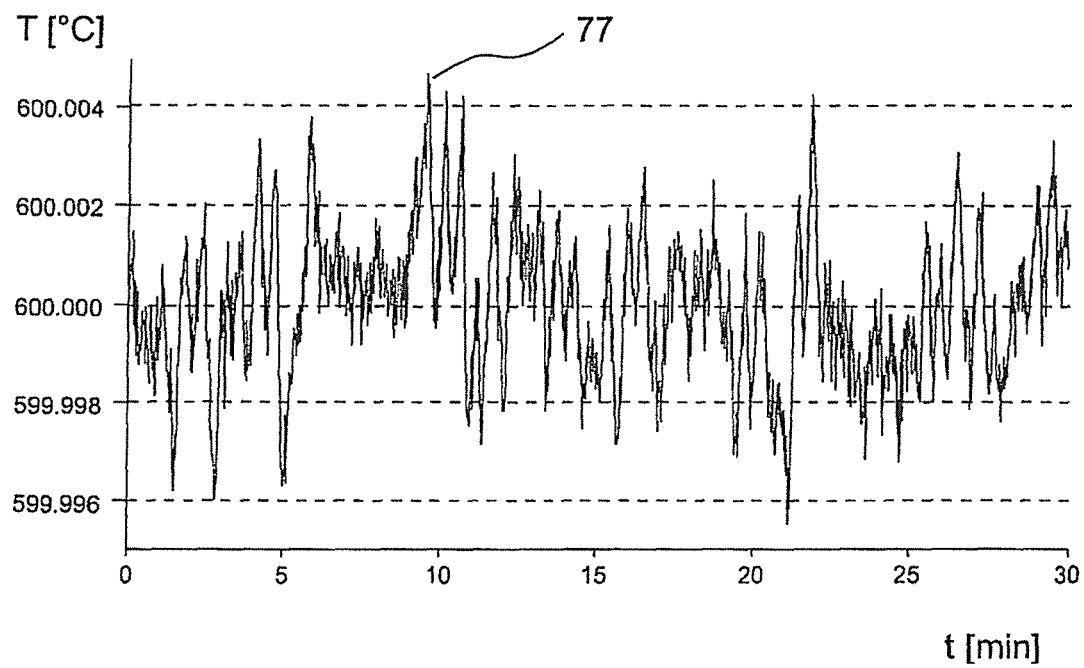
FIG. 4 shows temperature values 77 measured by means of the external reference sensor 7, which values result during the control of the temperature of the calibration volume 3 of a metal block calibrator to a target temperature of 600° C. using an adapted thermal model.

The discrete-time thermal model in the form of a linear difference equation with time-constant coefficients derived for the metal block calibrator considered in the embodiment is used in this manner both in the process step to estimate the thermal state and in the process step to determine the (pseudo) optimal setting of the control variable. This exemplary model-based control method yielded for the regulation of the calibration volume 3 of the metal block calibrator modeled in the embodiment to a target temperature of 600° C. in FIG. 4 a very stable control performance with a double standard deviation of the displayed temperature values 77 of the external reference sensor of 2σ≤3 mK.

LIST OF REFERENCE NUMBERS

1 Heat Source
2 Heat conducting part
3 Calibration volume
4 Receiving bore for the sample
5 Heat sink
6 Internal reference sensor
7 External transducer
11 1. Element of the model
12 2. Element of the model
13 3. Element of the model
14 4. Element of the model
15 5. Element of the model
16 6. Element of the model
17 7. Element of the model
18 8. Element of the model
19 9. Element of the model
60 Amplitude measurement values for the internal transfer function
61 Amplitude characteristic of the internal transfer function
65 Phase measurement values for the internal transfer function
66 Phase response of the internal transfer function
70 Amplitude measurement values for the external transfer function
71 Amplitude characteristic of the internal transfer function
75 Phase measurement values for the external transfer function
76 Phase response of the external transfer function
77 Displayed temperature values of the external reference sensor

The invention claimed is:

1. A method for controlling a temperature of a calibration volume of an apparatus for comparative calibration of temperature sensors to a target temperature, the method comprising the steps of:

providing a calibration apparatus having heat sources and/or heat sinks which are in thermal contact with a calibration volume through one or more heat conducting parts, the calibration apparatus further having at least one temperature sensor disposed in the calibration apparatus;

estimating a true thermal state at each time increment over a period of time using a Kalman filter and a thermal model of dynamics of thermal states of the calibration apparatus, the true thermal state including at least one temperature of the at least one temperature sensor, wherein the Kalman filter is supplied measured values from the at least one temperature sensor disposed in the calibration apparatus and the thermal model includes at least one control and manipulated variable, the at least one control and manipulated variable having at least two possible settings;

calculating a mean square deviation of the at least one temperature of the at least one temperature sensor from the target temperature using the estimated true thermal state and the thermal model of the dynamics of the thermal states of the calibration apparatus for the at least two possible settings of the at least one control and manipulated variable at each time increment over the period of time;

setting, at each time increment over the period of time, the at least two possible settings of the at least one control and manipulated variable for the calibration apparatus, such that the calculated mean square deviation is at a minimum; and whereby with the at least two possible settings of the at least one control and manipulated variable being set at each time increment over the period of time, the at least one temperature of the at least one temperature sensor reaches the target temperature and holds the at least one temperature of the at least one temperature sensor at the target temperature.

2. A method in accordance with claim 1, wherein:
the model of the dynamics of the thermal states is a discrete-time model; and
the step of estimating a true thermal state comprises calculating a thermal state using a linear difference equation with time-constant coefficients, the time-constant coefficients being dependent on the target temperature.

3. A method in accordance with claim 1, wherein:
the true thermal state includes at least one of:
a) temperatures;
b) heat flows; or
c) temporal changes of temperatures;
in at least one of:
d) the calibration volume;
e) the heat conducting parts; or
f) the ambient conditions of the calibration apparatus.

4. A method for controlling a temperature of a calibration volume of an apparatus for comparative calibration of temperature sensors to a target temperature, the method comprising the steps of:

providing a calibration apparatus having heat sources and/or heat sinks which are in thermal contact with a calibration volume through one or more heat conducting parts, the calibration apparatus further having at least one temperature sensor disposed in the calibration apparatus;

estimating a current value of a true thermal state using a Kalman filter, wherein the Kalman filter is supplied measured values from the at least one temperature sensor disposed in the calibration apparatus; and calculating a future value of the true thermal state using a thermal model of dynamics of thermal states of the calibration apparatus, wherein the thermal model includes at least one control and manipulated variable, the at least one control and manipulated variable having at least two possible settings;

adjusting the heat sources and/or heat sinks according to the at least two possible settings of the at least one control and manipulated variable to bring a temperature of the at least one temperature sensor closer to the target temperature;

wherein the true thermal state includes at least a difference between a systematic deviation of measurement values of a first temperature sensor and a systematic deviation of measurement values of a second temperature sensor.

5. A method in accordance with claim 4, wherein:
the difference between a systematic deviation of measurement values of a first temperature sensor and a systematic deviation of measurement values of a second temperature sensor is a constant.

6. A method in accordance with claim 4, wherein:
a difference between a systematic deviation of temperature readings of a temperature sensor to be calibrated and a systematic deviation of temperature readings of a reference standard is calculated.

7. An apparatus for controlling a temperature of a calibration volume for comparative calibration of temperature sensors to a target temperature, the apparatus comprising:

a calibration apparatus having heat sources and/or heat sinks which are in thermal contact with a calibration volume through one or more heat conducting parts, the calibration apparatus further having at least one temperature sensor located in the calibration apparatus;

at least one microcontroller that receives measurement data from the at least one temperature sensor located in the calibration apparatus, the at least one microcontroller implementing a thermal model of dynamics of thermal states of the calibration apparatus, the thermal model includes at least one control and manipulated variable of the heat sources and/or heat sinks having at least two possible settings, the at least one microcontroller further implementing estimating a thermal state of the calibration apparatus using the received measurement data and a Kalman filter and further implementing calculating the at least two possible settings of the at least one control and manipulated variable and adjusting the heat sources and/or heat sinks according to the calculated at least two possible settings of the at least one control and manipulated variable to bring a temperature of the at least one temperature sensor closer to the target temperature;

wherein the thermal state comprises at least a difference between a systematic deviation of measurement data of a first temperature sensor and a systematic deviation of measurement data of a second temperature sensor.

8. An apparatus for controlling a temperature of a calibration volume for comparative calibration of temperature sensors to a target temperature, the apparatus comprising:

a calibration apparatus having at least one temperature sensor located in the calibration apparatus;

at least one electronic data processing unit that receives measurement data from the at least one temperature sensor located in the calibration apparatus, the electronic data processing unit implementing a thermal model of dynamics of thermal states of the calibration apparatus, wherein the thermal model includes at least one control and manipulated variable, the at least one control and manipulated variable having at least two possible settings;

wherein the at least one electronic data processing unit estimates a thermal state of the calibration apparatus at each time increment over a period using the received measurement data and a Kalman filter and a thermal model of the dynamics of the thermal states of the calibration apparatus, the thermal state including at least one temperature;

wherein the at least one electronic data processing unit further calculates a mean square deviation of the at least one temperature from the target temperature using the estimated thermal state and the thermal model of the dynamics of the thermal states of the calibration apparatus for the at least two possible settings of the at least one control and manipulated variable;

wherein the at least two possible settings of the at least one control and manipulated variable at each time increment over the period is set for the calibration apparatus;

wherein the at least one electronic data processing unit further implements adjusting the heat source and/or heat sinks according to the at least two possible settings of the at least one control and manipulated variable at each time increment over the period to bring a temperature of the at least one temperature sensor closer to the target temperature; and wherein the calculated mean square deviation based on the at least two possible settings of the at least one control and manipulated variable set at each time increment over the period is at a minimum.

9. An apparatus in accordance with claim 8, wherein the electronic data processing unit is a microcontroller.

10. An apparatus in accordance with claim 8, wherein the thermal model of the dynamics of the thermal states of the calibration apparatus is a discrete-time model, and the procedure for calculating the thermal state is a linear difference equation with time constant coefficients and the time constant coefficients are dependent on the target temperature.

11. An apparatus in accordance with claim 10, wherein the time constant coefficients are stored in a non-volatile memory.

12. An apparatus for controlling a temperature of a calibration volume for comparative calibration of temperature sensors to a target temperature, the apparatus comprising:

a calibration apparatus having heat sources and/or heat sinks which are in thermal contact with a calibration volume through one or more heat conducting parts, the calibration apparatus further having at least one temperature sensor located in the calibration apparatus;

at least one microcontroller that receives measurement data from the at least one temperature sensor located in the calibration apparatus, the at least one microcontroller implementing a thermal model of dynamics of thermal states of the calibration apparatus, wherein the thermal model includes at least one control and manipulated variable of the heat sources and/or heat sinks having at least two possible settings, the at least one microcontroller further implementing calculating the at least two possible settings of the at least one control and manipulated variable and adjusting the heat sources and/or heat sinks according to the calculated at least two possible settings of the at least one control and manipulated variable to bring a temperature of the at least one temperature sensor closer to the target temperature;

wherein:
the at least one microcontroller estimates a current value of a true thermal state of the calibration apparatus using the received measurement data and a Kalman filter;
the at least one microcontroller further calculates a future value of the true thermal state of the calibration apparatus using the estimated current value of the true thermal state and the thermal model of the dynamics of the thermal states of the calibration apparatus, the true thermal state including at least one temperature;
a mean square deviation of the at least one temperature from the target temperature is calculated using an estimate of the true thermal state and a discrete-time model of the dynamics of the thermal states of the calibration apparatus for the at least two possible settings of the at least one control and manipulated variable over a period;
the at least two possible settings of the at least one control and manipulated variable over the period is output via an interface; and
the at least two possible settings of the at least one control and manipulated variable over the period are set for the calibration apparatus, wherein the calculated mean square deviation based on the at least two possible settings of the at least one control and manipulated variable over the period is at a minimum.

13. A method for controlling a temperature of a calibration volume of an apparatus for comparative calibration of temperature sensors to a target temperature, the method comprising the steps of:
providing a calibration apparatus having heat sources and/or heat sinks which are in thermal contact with a calibration volume through one or more heat conducting parts, the calibration apparatus further having at least one temperature sensor disposed in the calibration apparatus;
providing a thermal model of dynamics of thermal states of the calibration apparatus, wherein the thermal model includes at least one control variable, the at least one control variable having at least two possible settings;
measuring, at a current time increment, a temperature of the calibration volume by the at least one temperature sensor disposed in the calibration apparatus;
estimating, at the current time increment, a true thermal state of the calibration apparatus using a Kalman filter based on a possible setting of the at least one control variable and the measured temperature, the true thermal state including at least one temperature;
calculating, at the current time increment, the at least two possible settings of the at least one control variable for every time increment over a period using the estimated true thermal state and the thermal model of dynamics of thermal states of the calibration apparatus, wherein a future value of the true thermal state of the calibration apparatus is calculated using the thermal model and the calculated at least two possible settings of the at least one control variable over the period;
determining an optimal setting of the at least one control variable at each time increment over the period, wherein a mean square deviation between the at least one temperature and the target temperature is a minimum;
setting the at least one control variable to the optimal setting for the current time increment;
adjusting the heat sources and/or heat sinks according to the calculated at least two possible settings of the at least one control variable to bring a temperature of the at least one temperature sensor closer to the target temperature; and
repeating the measuring step, the estimating step, the calculating step, the determining step, the setting step, and the adjusting step.

14. A method in accordance with claim 13, wherein the Kalman filter is discrete.

15. A method in accordance with claim 13, wherein the thermal model is a discrete-time model.

16. A method in accordance with claim 13, wherein the determining of the optimal setting of the at least one control variable at each time increment over the period is fine-tuned by randomizing a setting of the at least one control variable from a previous time increment.

17. A method in accordance with claim 13, wherein the true thermal state includes at least a difference between a systematic deviation of measurement values of a first temperature sensor and a systematic deviation of measurement values of a second temperature sensor.

18. A method in accordance with claim 17, wherein the difference between a systematic deviation of measurement values of a first temperature sensor and a systematic deviation of measurement values of a second temperature sensor is a constant.

19. A method in accordance with claim 13, wherein the at least one control variable is corresponding to a heating or cooling power.

20. A method in accordance with claim 13, wherein a number of possible temporal sequences of the at least one control variable finite over the period of time.

21. A method in accordance with claim 13, wherein the at least two possible settings of the at least one control variable are selected from a subset which mean square deviations are not greater than a predetermined mean square deviation.

22. A method in accordance with claim 13, wherein the optimal setting of the at least one control variable determined at each time increment over the period is used as a starting bit sequence for a next time increment and a subset of the at least two possible settings at the next time increment is generated by randomly inverting individual bits of the starting bit sequence.

* * * * *